Nov. 25, 1958 H. T. CARTER 2,862,062
HOLDING ARRANGEMENT FOR UNIVERSAL-TYPE LINE CIRCUIT
Filed May 22, 1956
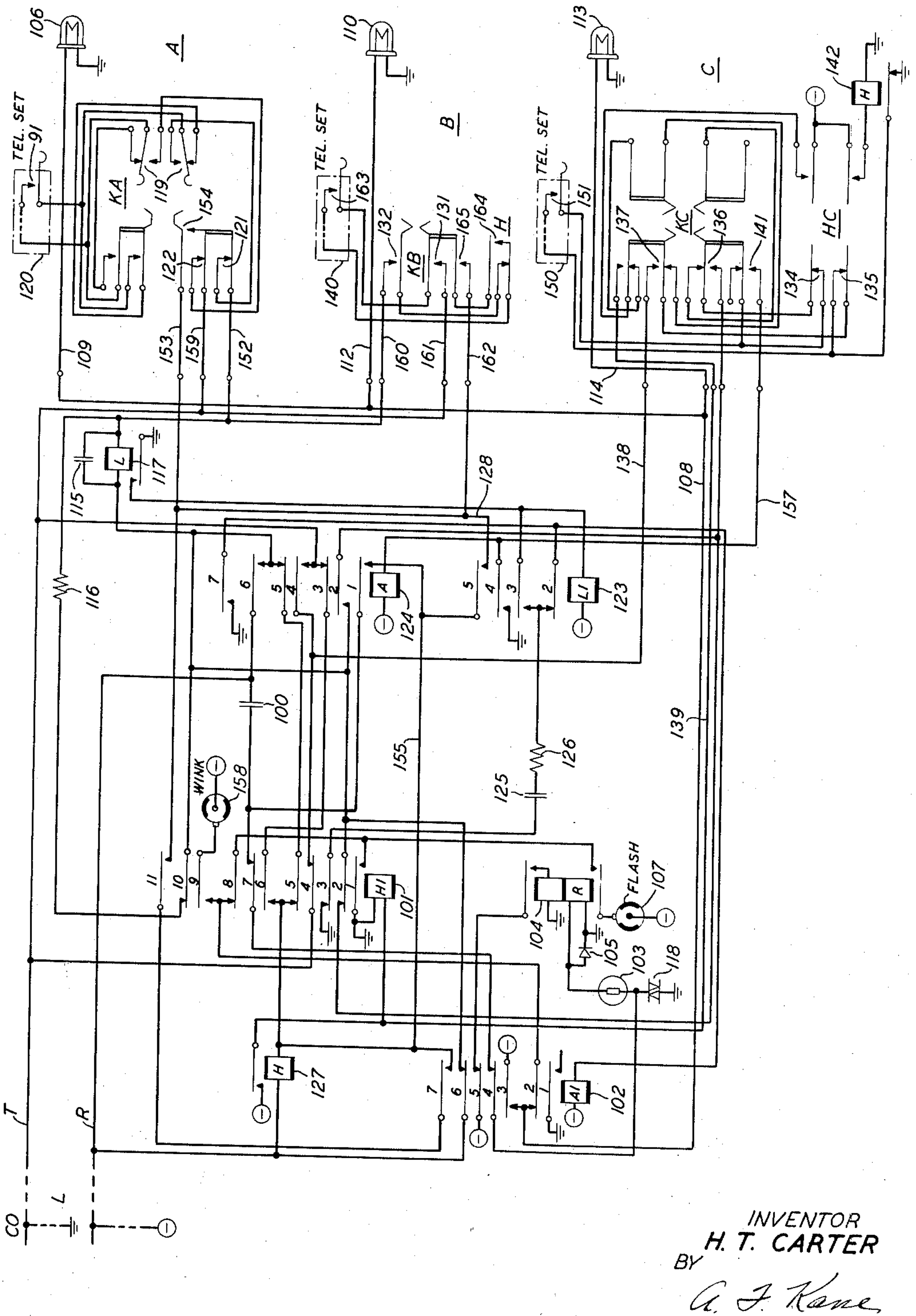
INVENTOR
H. T. CARTER
BY
A. F. Kane
ATTORNEY

United States Patent Office 2,862,062

Patented Nov. 25, 1958

2,862,062

HOLDING ARRANGEMENT FOR UNIVERSAL-TYPE LINE CIRCUIT

Herman T. Carter, Madison, N. J., assignor to Bell Telephone Laboratories, Incorporated, New York, N. Y., a corporation of New York Application May 22, 1956, Serial No. 586,480

5 Claims. (Cl. 179—99)

This invention relates to telephone systems and particularly to communication facilities located at subscribers' premises and known generally as key telephone switching facilities.

Business and resident subscribers requiring access to more than one telephone line have been equipped according to one of a number of standard "wiring plans," each of which included a different set of features, such as means for picking up any one of a number of central office, private branch exchange, private or intercommunicating lines for originating or answering calls thereon, holding one line while another is seized for use, cutting off extension stations or ringers, and signalling on intercommunicating circuits. The increasing diversiy of the so-called "wiring plan" subsequently led to a coordination of designs which were characterized as "key equipments" primarily because the switching functions thereof were performed by manually operable keys mounted on the face of a relatively small desk- or table-mounted cabinet. With the development of the combined telephone set, with all the usual station apparatus in one housing, the so-called "key telephone system" has evolved. Such a system is characterized principally by the incorporation of the line pick-up and hold keys and signal lamps in the base of the telephone set.

In general, the functions performed by a key equipment and by a key telephone system are similar. However, each has its own distinctive character and circuitry and is used extensively in the telephone plant. Usually, the requirements of any one subscriber can be met by either a standard type of key equipment or by a standard type of key telephone system and both types of facilities are in popular demand. However, it is becoming increasingly apparent that the requirements of many subscribers may best be met by combining various types of standard key switching facilities.

It is the object of this invention to improve key telephone switching facities installed on subscribers' premises with a view toward universalizing certain circuit units to render them suitable for use with any of a number of otherwise distinctively characterized key equipments and key telephone systems.

This object is attained in accordance with a feature of the invention by the provision of a single universal design of line circuit which functions with a number of differently characterized key switching facilities in completing connections between a subscriber's station and a central office or private branch exchange, and which provides holding and signaling features compatible with similar features of line circuits heretofore specially designed for use with such facilities.

In accordance with another feature of the invention, the universal line circuit functions to effectively complete a holding bridge circuit in response to the removal of ground potential from a control conductor at one type of station or to the substitution of a hold conductor for the ring conductor at another type of station.

Another feature of the invention resides in normally guarding the hold relay of the holding bridge circuit against false operation due to ringing or transient currents, and in ensuring the removal of such guard for a predetermined interval of time following the actuation of a hold key at a station, and in completing the holding bridge connection during such time interval. A related feature involves means responsive to the actuation of the hold key for effectively connecting the winding of the guard control relay to a capacitor-resistor circuit to thereby subject the relay to a charging current and thus maintain the relay operated for a predetermined interval of time following the operation of the hold key.

These and other features of the invention will be better understood from the following description when read with reference to the accompanying drawing, the single figure of which constitutes a circuit diagram of the universal line circuit of this invention and illustrates three possible station terminations thereof.

The line circuit L is shown terminating in key switching equipments of three different characters which, for purposes of simplicity of description are shown located at three different stations A, B and C. It is understood, however, that, in practice, all three types of key switching apparatus shown at A, B and C may be, and generally would be located at one station and would be served simultaneously by the single line circuit L. In other words, while the line circuit L is designed primarily for simultaneous use with a multiplicity of different types of key switching facilities located at one station, it may serve also in installations at which only one type of switching facility is in use. In the following descriptions the term station or substation is employed not only in its generally accepted meaning but also to describe a key position at a station in instances wherein the three illustrated key switching facilities are located at one station.

As will be described in detail hereinafter, the operation of key KA at A to its hold or left position opens the ring conductor 152 and connects the hold conductor 153 to the tip lead 159, while the operation of the hold key HC at C results in the removal of ground potential from conductor 157. Both of these diverse conditions are recognized by the line circuit L with the same result, that is, the connection of a holding bridge acros the line. The condition at B which prevails when the hold key H is operated, is substantially the same as that which is encountered at station A under similar conditions.

The operation of the universal line circuit of this invention, when used with the various types of key switching facilities shown at A, B and C, will now be described in detail. For purposes of clarity, the various operating functions of the circuit are described under appropriate headings.

*Signaling*

When signaling current is applied at a central office or P. B. X to the line circuit L on an incoming call, the alternating-current component flows from the central office or P. B. X source (not shown) over the ring conductor R, through capacitor 100, over the No. 7 armature contacts of relay 101, the No. 4 armature contacts of relay 102, thermistor 103, the lower winding of relay 104 on one-half cycle of the ringing current, and varistor 105 on the other half cycle, to ground. The thermistor 103 has a cool resistance in the order of 50,000 ohms which prevents relay 104 from operating when ringing current is first applied, thereby preventing false operation of the relay on disconnect or other transient currents. Power absorbed from the ringing current increases the temperature of the thermistor and reduces its resistance to the order of 3,000 ohms in approximately one-half second, permitting sufficient current to flow to operate relay 104 on the half-wave rectified current produced by the varistor 105. Relay 104 locks operated in a circuit which includes ground, the upper winding and armature contacts of relay 104, the No. 5 armature contacts of relay 102 and negative battery. Relay 104 thus is held operated under control of relay 102. It is apparent that relay 104 may be held operated under control of a time out circuit in order to ensure its release in the event an incoming call is not answered within a predetermined time. This feature is well known in the art and a showing thereof in this application has been omitted for purposes of simplicity of disclosure. Varistor 118 is used to prevent damage to the thermistor 103 which might be caused by transients.

It will now be assumed, for descriptive purposes only, that the line L is terminated only at a key equipment station such as is shown at A. It will be understood that, in practice, the key equipment located at station A may include a plurality of keys similar to the key KA illustrated, which keys would serve to associate the attendant's telephone apparatus with lines other than the line L disclosed. It will be understood, as previously indicated that the line L may be terminated simultaneously also at stations or positions such as are indicated at B and C.

Lamp 106 which is individual to key KA at A is now intermittently lighted or flashed in a circuit which includes negative battery, the interrupter 107, which in practice may be replaced by a relay type of flashing circuit, the lower armature contacts of relay 104, the No. 8 armature contacts of relay 101, the No. 2 armature contacts of relay 102, conductors 108 and 109, the filament of lamp 106, and ground. The flashing of lamp 106 in this circuit serves as a call signal at A and identifies the line L as the line on which the call has arrived.

If the line L is terminated also in a key telephone system such as is indicated at B, the lamp 110 at B would also be lighted intermittently over the circuit just described except that conductor 112 is substituted for conductor 109 and the filament of lamp 110 for the filament of lamp 106.

Similarly, if the line L is also terminated in a key equipment such as is illustrated at C, the lamp 113 would flash in the same circuit previously traced except that conductor 114 would be substituted for conductor 109 and the filament of lamp 113 for the filament of lamp 106. If all three switching equipments shown at A, B and C are located at one station, as generally would be the case, the three lamps 106, 110 and 113 would function simultaneously.

It is apparent that the line circuit L will serve with any one of the three types of line terminations illustrated, to effect the operation of a flashing call signal at any one or all of the corresponding locations A, B and C, incident to the application of ringing current to the line at the central office or P. B. X. Should any of the illustrated equipments be provided with a bridge type ringer, the shunts provided by capacitor 115 and the 70-ohm noninductive winding 116 of relay 117 prevent false operation of relay 117 on ringing current. The relay winding 116, for purposes of simplification, is illustrated on the drawing as being independent of the relay structure.

*Answering an incoming call*

The incoming call on line L, just described, is answered, for example, by the attendant at A operating the pick-up key KA associated with the flashing lamp 106. This key is a three-position key having a normal right-hand position, a center or talking position and a left-hand or hold position. To answer the call indicated by the flashing lamp 106, therefore, the key KA is moved out of its righthand position and into its center or talking position and the attendant's telephone handset is removed from its mounting. Incident to these operations, the upper and lower contacts 119 of key KA are closed, as are also the switchhook contacts 91 associated with the telephone set indicated at 120. Line relay 117 is now operated over a circuit which includes negative battery at the central office or P. B. X, the ring conductor R of line L, the No. 6 armature contacts of relay 102, the winding of relay 117 and its parallel-connected non-inductive winding 116, conductor 152, normal contacts 121 of key KA, lower alternate contacts 119 of key KA, receiver switchhook contacts 91, upper alternate contacts 119 of key KA, normal contacts 122 of key KA, conductor 159, tip conductor T, and ground at the central office or P. B. X.

Relay 117, operated, completes an obvious operating circuit for relay 123 in which relay 123 operates. Relay 123, at its No. 4 armature contacts completes an obvious operating circuit for relay 124, and at its No. 3 armature contacts, it connects capacitor 125 to ground at the armature contacts of relay 117 by way of resistor 126. Capacitor 125, which was originally held charged to negative battery through the winding of relay 102, accordingly is discharged. At its No. 1 armature contacts, relay 124 connects capacitor 100, associated with the ring conductor R of line L, to the conductor 128 and thence to conductor 153 by way of the No. 5 armature contacts of relay 123. At its No. 5 armature contacts, relay 124 opens the holding circuit which includes the winding of relay 127. At its Nos. 6 and 4 armature contacts relay 124 cuts through the tip and ring conductors to the telephone station A, and at its No. 7 armature contacts it completes an obvious operating circuit for relay 102. Relay 102, operated, removes the normal short circuit from the winding of relay 127 by way of its No. 6 armature contacts; at its No. 5 armature contacts it opens the locking circuit to relay 104 permitting this relay to release; at its No. 4 armature contacts it opens the energizing circuit for relay 104 thus removing the ringing circuit from the ring conductor of the line to prevent it from introducing an unbalanced impedance to ground during the talking period; and at its Nos. 2 and 3 armature contacts, it transfers the circuit for signal lamp 106 at station A from the flashing interrupter 107 to steady battery associated with the No. 3 armature contacts of relay 102. The lamp signal 106 is now operated steadily to indicate the busy condition of the line and the talking condition is established between the station A and the central office or P. B. X.

In the event the line L is terminated also in a key switching apparatus such as is indicated by the equipment shown at B, the attendant noting the flashing of lamp 110, proceeds to answer the incoming call by operating pick-up key KB associated with the flashing lamp and by removing the handset of the telephone set indicated at 140 from its support. The ensuing circuit operations are the same as described in connection with the answering of a call with the equipment shown at A. It is believed that no further reference to this aspect of the circuit operation need be made except to state that the lamp 110 is now lighted steadily and the telephone set 140 is connected across the tip and ring conductors of the line L by way of contacts 131 and 132 of key KB.

Should the line L be terminated also in key equipment such as is shown at C, the attendant upon noting the flashing lamp 113, operates the pick-up key KC to the left and removes the telephone handset associated with the telephone set 150 from its support. The telephone at C is thereby connected across conductors 138 and 139 by way of contacts 134 and 135 of hold key HC and contacts 136 and 137 of pick-up key KC, the conductors 138 and 139 being connected to the tip and ring conductors T and R, respectively, of line L by way of the No. 4 armature contacts of relay 101 and the No. 2 armature contacts of relay 101 and the No. 6 armature contacts of relay 102. Incident to the removal of the telephone from its mounting, the switchhook contacts 151 are closed so that relay 124 now operates in a circuit which includes negative battery, the winding of relay 124, conductor 157, contacts 141 of key KC, switchhook contacts 151, the normal armature contacts of hold relay 142, and ground. Relay 124, operated, performs the same functions ascribed to it heretofore. Specifically, it completes an obvious operating circuit for relay 102; opens the holding circuit which includes the winding of relay 127; and cuts through the tip and ring conductors of the line L to C. Relay 102, operated, also performs those functions heretofore ascribed to it, one of which is to alter the character of the lamp signal 113, changing it from a flashing signal to a steady signal.

It will be observed from the description thus far advanced that relay 124 is controlled by line relay 117 through relay 123 when the line L is terminated in equipment such as shown at A and B, and is controlled independently of line relay 117 when the line L terminates in equipment of the type indicated at C. When operated, however, relay 124 in each instance performs the same general functions with respect to the line L and to the signaling equipment corresponding to the several key switching equipments illustrated.

*Holding*

To hold a connection on line L with the equipment shown at A, the key KA is moved from its center or talking position to its left or hold position. It will be observed that incident to this operation of key KA, the key contacts 154 are closed before the contacts 121 and 122 are opened. The closure of contacts 154 and the opening of contacts 122 result in the connection of the hold conductor 153 to the tip conductor 159 while the opening of contacts 121 results in the opening of the ring conductor 152. The latter results in the interruption of the operating circuit for relay 117 and causes this relay to release. Relay 117, released, causes relay 123 to eventually release and, in turn, to release relay 124. It will be noted that capacitor 125 and resistor 126 are connected between ground and negative battery by way of the No. 3 armature contacts of relay 101, the No. 3 armature contacts of relay 123 and the winding of relay 123. Thus, when relay 117 releases its armature, as described, the capacitor charges in the circuit just traced and relay 123 is held operated on the charging current. The relay 123 therefore, does not immediately release upon release of relay 117. When relay 123 eventually releases, it opens the operating circuit for relay 124 which relay thereupon releases. When relay 124 releases, the operating circuit for relay 102 is opened at the No. 7 armature contacts of relay 124, but relay 102 does not immediately release because, as soon as relay 123 releases, the capacitor 125 and resistor 126 are connected in series with the winding of relay 102 by way of the No. 2 armature contacts of relay 123. Relay 102, therefore, remains operated for an interval of time following the release of relay 124.

During the interval in which relay 123 holds operated, relay 127 operates in a circuit extending from negative battery on the ring conductor R of line L, over the winding of relay 127, conductor 155, the No. 5 armature contacts of relay 123, conductors 128 and 153, contacts 154 of key KA, conductor 159, tip conductor T of line L, to ground. Relay 127, operated, completes an obvious operating circuit for relay 101.

When relay 123 releases, and during the interval in which relay 102 remains operated after the release of relay 124, relay 127 is held operated in a circuit extending from negative battery at the ring conductor R of line L, through the winding of relay 127, over the No. 7 armature contacts of relay 102, the No. 11 armature contacts of relay 101, conductor 153, contacts 154 of key KA, conductor 159, tip conductor T of line L, to ground. With relay 101 operated, as described, the winding of relay 127 is connected across the tip and ring conductors of line L, independently of the substation equipment, by way of the No. 6 armature contacts of relay 101 and the No. 3 armature contacts of relay 124. Thus the winding of relay 127 constitutes a holding bridge and serves to hold the central office or P. B. X connection involving the line L, independently of the station equipment.

Relay 101, at its No. 7 armature contacts, disconnects the ring-up circuit from the line to prevent crosstalk; at its No. 9 armature contacts it connects the winking interrupter 158 in circuit with lamp 106 at A by way of the No. 2 armature contacts of relay 102 and conductors 108 and 109. The lamp 106 thus operates at a winking frequency to indicate a hold condition. It is understood that the lamps 110 and 113 at B and C are similarly operated. At its Nos. 4 and 5 contacts, relay 101 opens the tip and ring leads to the station set to prevent the station set from bridging the line in parallel with the holding bridge should the attendant hold the key KA in its left or hold position after relay 102 is released. Return of the key KA from its hold position to its normal right position disconnects the station and leaves the holding bridge across the line.

The hold condition is established with the equipment at B in substantially the same manner just described. In this instance, however, the hold key is separate and distinct from the key KB. Its operation, however, results in the performance of the same functions as does the operation of key KA at A to its hold position, namely, opens the ring conductor 160 and connects the tip conductor 161 to the hold conductor 162 by way of key contacts 131, switchhook contacts 163, and key contacts 164 and 165. The operating path to relay 117 is therefore open, as in the preceding case, and the hold condition is established in the manner previously described.

To hold the connection at C, the hold key HC is operated to complete an obvious operating circuit for relay 142. Relay 142, operated, removes ground from conductor 157, thereby releasing relay 124. The circuit including capacitor 125 and resistor 126 which was held in the discharged condition by ground at the No. 7 armature contacts of relay 124, will charge through the winding of relay 102 and thereby delay the release of this relay so that the immediate short-circuiting of relay 127 is prevented, which short-circuiting will otherwise be completed at the No. 6 armature contacts of relay 106.

Relay 127 operates on line current through the key set at C in a circuit which includes negative battery on the ring conductor R of line L, the winding of relay 127, the No. 5 armature contacts of relay 101 and of relay 124, the No. 2 armature contacts of relay 101, contacts 136 of key KC, contacts 134 of key HC, switchhook contacts 151, contacts 135 of key HC, contacts 137 of key KC, conductor 138, the No. 4 armature contacts of relay 101, tip conductor T of line L, to ground. Relay 127, operated, completes an obvious operating circuit for relay 101.

Relay 101, operated, connects the winding of relay 127 across the tip and ring conductors of line L independently of the equipment at C, as a hold bridge, the connection including the No. 6 armature contacts of relay 101 and the No. 3 armature contacts of relay 124. Thus, the holding of the central office or P. B. X connection is completed. Relay 101, at its No. 7 armature contacts, disconnects the ring-up circuit from the line to prevent crosstalk; at its No. 9 armature contacts it substitutes the interrupter 158 for negative battery on the No. 3 contacts of relay 102 in the circuit of lamp 113, thereby altering the character of the signal displayed by the lamp 113, changing it from a steady signal to one of a winking character, as a hold signal. This change from a steady lamp signal to a winking signal is completed when relay 102 releases, thereby opening its No. 3 armature contacts and closing its No. 2 armature contacts. Relay 101, at its Nos. 4 and 2 armature contacts opens the tip and ring conductors of the line L to substation C to prevent the station set from bridging the line in parallel with the holding bridge should the attendant hold the HC key operated after relay 102 has released.

*Release of the holding bridge*

When the attendant at any of the stations A or B re-seizes the line L by operating the associated pick-up key KA or KB and removing the handset from its mounting, relay 117 is operated on line current through the station set since the circuit of relay 117 and the station set, under this condition, is bridged across the line L in parallel with the holding bridge. The relay 117 is in a condition of maximum sensitivity since the 70-ohm shunt resistor 116 across the relay winding is open at the No. 10 armature contacts of relay 101. Relay 117, operated, operates relay 123 which, in turn, operates relay 124. Relay 124 at its No. 3 armature contacts, opens the circuit of the holding bridge causing relay 127 to release, which relay, in turn, releases relay 101, thus restoring the circuit to the talking condition.

When the line L is again seized at C by the operation of key KC and the removal of the telephone handset from its mounting, relay 124 is operated by the reconnection of ground at the armature contacts of relay 142 to conductor 157 by way of the switchhook contacts 151 and the key contacts 141. The removal of the hold condition is then effected as described above and the circuit is restored to talking condition.

*Disconnection*

When any one of the stations A, B or C disconnects on either incoming or outgoing calls, relays 124 and 102 release, extinguishing the signal lamps 106, 110 and 113 and restoring the circuit to normal.

*Outgoing calls*

The procedure for originating an outgoing call from any of the stations A, B and C is the same as for answering an incoming call at that station except that relay 104 will already be released. The call is advanced in the usual manner. When dialing from such stations as A and B, the line relay 117 may tend to follow the dial pulses, but relay 117, being slow to release because of the capacitor 125 and resistor 126, will hold operated during the dialing period and will not respond to dial pulses.

What is claimed is:

1. In a telephone system, a central office, a source of current thereat, a plurality of stations, a line circuit arranged to interconnect said central office with any of said stations, switching means at each of said stations comprising keys for connecting the corresponding station to said line circuit, each of said keys including hold contacts, a holding bridge, means for connecting said holding bridge across said line, relay means in said line circuit operated by current from said source incident to the seizure of said line circuit at one of said stations to disable said holding bridge-connecting means, means including the hold contacts of the switching means at one of said stations for releasing said relay means and to thereby enable said holding bridge-connecting means, and means including the hold contacts of the switching means at another of said stations for enabling said holding bridge-connecting means independently of said relay means.

2. A telephone system according to claim 1 in which said holding bridge is first connected across said line by way of the switching means at either of said stations and subsequently independently of said switching means, and means is provided to normally short-circuit said holding bridge and thereby render it immune to transients.

3. A telephone system according to claim 1 in which said holding bridge is first connected across said line by way of the switching means at either of said stations and subsequently independently of said switching means, means is provided to normally short-circuit said holding bridge and thereby render it immune to transients, means responsive to the operation of the hold contacts of said switching means is provided for momentarily disabling said short-circuiting means, and means is provided for connecting said holding bridge across said line circuit independently of said switching means during the momentary disabling of said short-circuiting means.

4. In a telephone system, a central office, a substation, a line circuit interconnecting said central office and said substation for speech transmission purposes, a holding bridge circuit, means for controlling the connection of said holding bridge circuit across said line circuit including a first relay, a second relay, and a key at said substation, said relays being maintained operated during the period said line circuit is used for speech transmission between said central office and said substation, means controlled by one of said relays when operated for completing an operating circuit for said second relay, means controlled by said second relay, when released, for short-circuiting said holding bridge circuit, means controlled by said key, when operated, for releasing said first relay whereby the operating circuit for said second relay is interrupted, means controlled by said first relay, when released, for delaying the release of said second relay to thereby momentarily disable said short-circuiting means, and means controlled by said first relay when released and operative during the momentary disabling of said short-circuiting means for connecting said holding bridge directly across said line circuit.

5. In a telephone system, a central office having a source of direct current thereat, a substation, a line circuit interconnecting said central office and said substation, a hold relay connected in series with said central office battery and said substation, means normally short-circuiting said hold relay, means responsive to the seizure of said line at said substation for disconnecting said hold relay from said line and for interrupting said short-circuiting means, a hold key at said substation adapted, when operated subsequent to the line seizure, to release said line seizure-responsive means whereby said hold relay is reconnected in said line circuit in series with said substation and said central office source of direct current and said short-circuiting means is restored to its normal condition, means for delaying the restoration of said short-circuiting means to normal comprising a second relay, an energizing circuit therefor including a condenser-resistance combination, means also controlled by said line seizure-responsive means when operated by said hold key for effectively completing said energizing circuit and to thereby hold said second relay operated, and means controlled by said hold relay when connected in series with said substation during the interruption of said short-circuiting means for connecting said hold relay across said line circuit.

References Cited in the file of this patent

UNITED STATES PATENTS

| | | |
|---|---|---|
| 2,065,883 | Beaumont | Dec. 29, 1936 |
| 2,069,038 | Labaugh | Jan. 26, 1937 |
| 2,273,530 | King | Feb. 17, 1942 |